J. Fasig,
Mop Holder.
No 25,400.    Patented Sep. 13, 1859.
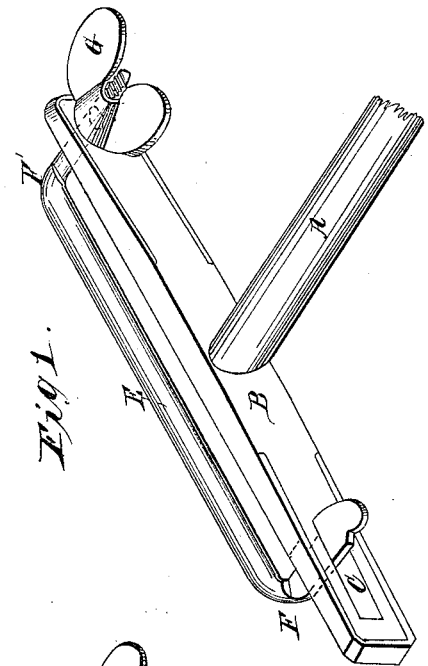
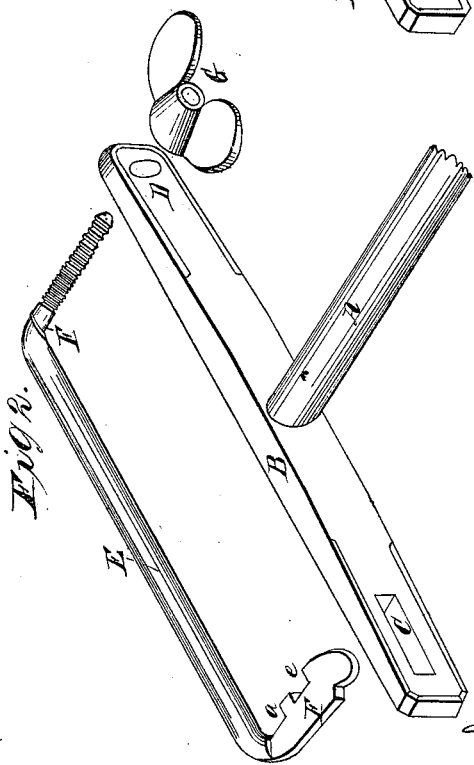
Witnesses.
J. Brainerd
[signature]
Inventor.
John Fasig

UNITED STATES PATENT OFFICE.

JOHN FASIG, OF WEST SALEM, OHIO.

MOP-HEAD.

Specification of Letters Patent No. 25,400, dated September 13, 1859.

*To all whom it may concern:*

Be it known that I, JOHN FASIG, of West Salem, in the county of Wayne and State of Ohio, have invented new and useful Improvements in Mop-Heads; and I do hereby declare that the following is a full and complete description and operation of the same, reference being had to the accompanying drawings, making part of this specification, in which—

Figure 1 is a perspective view. Fig. 2 is a perspective view with the parts detached.

Like letters refer to like parts.

The nature of my invention consists in such a form of construction that the rod which holds the cloth forms a lever, with a series of fulcrum notches that fit into a slot at one end of the cross head of the mop, and the opposite or long arm of the lever being supplied with a screw and nut, by means of which the cloth may be firmly secured between the cross head and lever as hereinafter described.

In Figs. 1 and 2, A represents the stem that enters the wooden handle of the mop. B, represents the cross head. These two parts A, B, are formed of one piece of iron. The stem A stands at right angles to the head B. At one end of the piece B there is a slot C, the length of which is about twice its width. The use of this I will hereafter explain. At the opposite end of the cross head B is a round hole D for the insertion of the long arm of the lever or rod E. Both ends of the lever or rod E are bent at right angles, as seen at F F'. The angle F is flattened so as to fit the slot C. Upon the inside of the angle F are a series of two or more notches $a$ $e$, into which the cross head at the inner end of the slot fits. The opposite end of the rod E is also turned at right angles and has a screw thread G, cut upon it, upon which is placed the nut G'. In order to remove the rod E from one notch to another, the nut must be removed from the screw, and the screw detached from the hole D, but when it is in place, as seen in Fig. 1, it cannot get out of the slot. In using this improvement if a light mop is desired the notch $a$ is placed in the slot and the screw F' passed through the hole D and the nut G screwed upon it. The cloth to form the mop is now properly adjusted between the head B and rod E, then by turning the nut G the cloths are firmly secured. If a large mop is desired, the rod E must be removed and placed in the notch $e$ and secured as before.

What I claim as my improvement and desire to secure by Letters Patent, is—

The herein named construction of a mop head, consisting of the piece B with the slot C and hole D, in combination with the rod E, notches $a$, $e$, screw, and nut G, when these several parts are arranged and operated substantially as set forth.

JOHN FASIG.

Witnesses:
 J. BRAINERD,
 S. H. MATHER.